(12) United States Patent
Nefzi (10) Patent No.: US 7,770,338 B2
(45) Date of Patent: Aug. 10, 2010

(54) METHOD FOR PRODUCING TRIANGULAR ELEMENTS DESIGNED FOR THE MANUFACTURE OF STRUCTURES AND RESULTING TRIANGULAR ELEMENTS

(76) Inventor: Abdessatar Nefzi, 56 rue Marrakech, 2060 la Goulette (TN)

( * ) Notice: Subject to any disclaimer, the term of this patent is extended or adjusted under 35 U.S.C. 154(b) by 0 days.

(21) Appl. No.: 11/659,596

(22) PCT Filed: May 6, 2005

(86) PCT No.: PCT/TN2005/000004

§ 371 (c)(1),
(2), (4) Date: Jan. 24, 2008

(87) PCT Pub. No.: WO2006/016860

PCT Pub. Date: Feb. 16, 2006

(65) Prior Publication Data

US 2008/0209821 A1   Sep. 4, 2008

(30) Foreign Application Priority Data

Aug. 10, 2004   (TN) .................................. SN04152

(51) Int. Cl.
*E04B 7/08*      (2006.01)
*E04H 12/00*    (2006.01)
*F16B 1/00*      (2006.01)

(52) U.S. Cl. .......................... 52/81.2; 52/81.1; 52/81.4; 52/648.1; 52/DIG. 10

(58) Field of Classification Search .................. 52/81.2, 52/81.3, 81.4, 648.1, 653.1, 655.1, DIG. 10, 52/204.55, 204.57, 204.58, 204.62, 204.64, 52/204.65

See application file for complete search history.

(56) References Cited

U.S. PATENT DOCUMENTS 909,268 A * 1/1909 Windle .................... 52/204.58

(Continued)

FOREIGN PATENT DOCUMENTS

CA   1211285   9/1986

(Continued)

OTHER PUBLICATIONS

International Search Report, completed Sep. 21, 2005, by the European Patent Office in counterpart foreign application No. PCT/TN2005/000004.

*Primary Examiner*—Robert J Canfield
*Assistant Examiner*—Babajide Demuren
(74) *Attorney, Agent, or Firm*—Abelman, Frayne & Schwab (57) ABSTRACT

Triangular elements for forming geodesic structures each have three elongated leg members arranged end-to-end to form three apexes. At least one of the apexes is formed with a curved-shaped indentation which extends along an outer surface and perpendicular to the opposing side surfaces. The legs of each triangular element also include one or more outer grooves extending longitudinally along the outer surface. Each outer groove is sized to receive a seal member. An inwardly raised shoulder extends longitudinally along the inner surface. An inner groove is formed along a side edge of the raised shoulder and each inner groove is sized to receive a seal member. Panels are positioned over the opposing sides to form double-walled triangular element. Channels extend through the outer surface and raised shoulder of the inner surface. The triangular elements are arranged to form a geodesic structure and fasteners extend through the channels to secure adjacent triangular elements.

27 Claims, 4 Drawing Sheets

U.S. PATENT DOCUMENTS

| | | | | |
|---|---|---|---|---|
| 2,979,064 | A * | 4/1961 | Fischer | 52/2.21 |
| 3,002,590 | A * | 10/1961 | Hannoosh et al. | 52/81.2 |
| 3,088,559 | A * | 5/1963 | Hannoosh et al. | 160/399 |
| 3,137,371 | A * | 6/1964 | Nye | 52/81.2 |
| 3,255,556 | A * | 6/1966 | Amato et al. | 52/81.4 |
| 3,325,958 | A * | 6/1967 | Moore | 52/647 |
| 3,341,989 | A * | 9/1967 | David | 52/81.2 |
| 3,710,806 | A * | 1/1973 | Kelly et al. | 135/145 |
| 3,810,336 | A * | 5/1974 | Sadao | 52/81.2 |
| 3,857,150 | A * | 12/1974 | Faucheux | 29/897.31 |
| 3,916,589 | A * | 11/1975 | Richter | 52/81.3 |
| 3,991,146 | A | 11/1976 | Barrie | |
| 3,994,106 | A * | 11/1976 | Grosser et al. | 52/223.6 |
| 4,009,543 | A * | 3/1977 | Smrt | 52/81.2 |
| 4,012,872 | A * | 3/1977 | Stolpin | 52/81.3 |
| 4,094,160 | A | 6/1978 | Galerne | |
| 4,194,851 | A * | 3/1980 | Littlefield | 403/218 |
| 4,309,852 | A * | 1/1982 | Stolpin | 52/81.3 |
| 4,333,446 | A * | 6/1982 | Smyth | 126/574 |
| 4,370,073 | A * | 1/1983 | Ohme | 403/172 |
| 4,531,333 | A * | 7/1985 | Huegy | 52/81.2 |
| 4,711,063 | A * | 12/1987 | Richter | 52/745.07 |
| 4,729,197 | A * | 3/1988 | Miller | 52/81.3 |
| 4,736,551 | A * | 4/1988 | Higson | 52/81.4 |
| 4,807,408 | A * | 2/1989 | Lew et al. | 52/81.2 |
| 5,704,169 | A * | 1/1998 | Richter | 52/81.2 |
| 5,732,518 | A * | 3/1998 | Roberts | 52/245 |
| 5,907,931 | A * | 6/1999 | Sun | 52/81.4 |
| 5,996,288 | A * | 12/1999 | Aiken | 52/81.3 |
| 6,240,694 | B1 * | 6/2001 | Castano | 52/653.1 |
| 6,701,691 | B1 * | 3/2004 | Niiduma | 52/745.2 |
| 2003/0213186 | A1 * | 11/2003 | Geiger | 52/81.3 |
| 2003/0226319 | A1 * | 12/2003 | Richards | 52/80.1 |
| 2005/0204688 | A1 * | 9/2005 | Sherman | 52/741.13 |

FOREIGN PATENT DOCUMENTS

| | | |
|---|---|---|
| DE | 2117332 | 10/1972 |
| DE | 2209756 | 9/1973 |
| FR | 1361878 | 5/1964 |
| GB | 1109139 | 4/1968 |
| WO | WO88/02718 | 4/1988 |
| WO | WO2005/054740 | 6/2005 |

* cited by examiner

METHOD FOR PRODUCING TRIANGULAR ELEMENTS DESIGNED FOR THE MANUFACTURE OF STRUCTURES AND RESULTING TRIANGULAR ELEMENTS

CROSS-REFERENCE TO RELATED APPLICATION

This application claims the benefit under 35 U.S.C. §371 to international application No. PCT/TN2005/000004, filed on May 6, 2005.

FIELD OF INVENTION

This invention relates to a manufacturing process for executing plane, curvilinear, polyhedral and spherical structures which may be decomposed into a finite number of triangles and more particularly, the present invention relates to a manufacturing process and triangular structures which can be arranged together to form, for example, domes from truncated cone icosahedrons, and chapel-shaped greenhouses.

BACKGROUND OF THE INVENTION

Implementation of geodesic domes is conventionally carried out through a series of different shaped triangular structural elements, which can be arranged in a specified pattern based on the frequency of the different shaped triangular structures that are chosen and linked at their tops (i.e., apexes) by knots. Such knots are various connector devices designed according to the manufacturing and securing methods chosen for the triangular structures. U.S. Pat. No. 4,009,543, issued Mar. 1, 1997 reveals an example thereof.

The fact of using prefabricated monobloc triangular structures in a plastic material and for which the interior of sides is empty is also described to construct domes, the assembly of which may be implemented by a screw-and-nut system, as illustratively disclosed in U.S. Pat. No. 5,732,518, issued Mar. 31, 1998.

Monobloc triangular structures, the plastic material of which is heat hardening resin, have also been described as being formed over a metal section, and one of the sides of which is revealed can be a curve to form a cylinder, as illustratively disclosed in Danish patent DE2117332A1, published Oct. 12, 1972.

The fact of covering the metal section with a thermoplastic polymer is also currently described in Patent WO 2005/054740A1 published Jun. 16, 2005. Spherical structures have been described as being achievable from triangular structures which however are not monobloc and the sides of which remain rectilinear, as illustratively described in British patent GB1109139A, published Apr. 10, 1968.

The execution of chapel-shaped greenhouses is also conventionally carried out using a series of triangles, groins, shafts. A thermal protection for greenhouses constructed according to a geodesic dome has been described in Canadian patent 1211285, Sep. 16, 1986. Nevertheless, nothing prevents from proceeding by using monobloc triangular structures, as for domes, in order to construct green-houses with chapel shape.

Execution of submarine bells for use in submarine works is also conventionally carried out using metallic structures with cylindrical or spherical shape generally manufactured according to such processes so as to make an only one structure. Execution of such structures in form of parts that can be assembled under water so as to obtain a cylindrical shape is nevertheless described in application publication no. WO880218, published Apr. 21, 1988. Adjunction to submarine bells of movable parts making doors or windows allowing panoramic sight through transparent materials is also described in U.S. Pat. No. 4,094,160, issued Jun. 13, 1978.

Manufacture of submarine bells for tourist use proceeds generally from execution of the sphere segment made in one block in transparent plastic material. For such tourist use, which means for pressure levels not exceeding three (3) absolute atmospheres, nothing, however, prevents from proceeding by using assembled triangular structures, as for domes, since such assembling ensures water tightness for the final structure of the bell.

The execution mode for geodesic domes and chapel-shaped greenhouses does not, however, offer-even by having the same known characteristics in combination of the state of the art, as described in the above mentioned patents, i.e. without the adjunction of other characteristics sought simultaneously:

An integral water-tightness for the structure;

The double water-tight partition allowing the circulation of a heat conducting fluid or the creation of a relative vacuum and therefore a more efficient thermal insulations;

An easiness during the fitting process with, to the extreme extent, the absence of complicated and costly preparation for ground or yard work and foundations, even on an uneven land; and A series manufacture of a limited number of identical elements which may serve in constructing final structures of various dimensions.

These four characteristics being sought are particularly interesting when it is being intended on economic and energetic levels to use greenhouses in arid and hostile environments, and domes for housing purposes in hostile environments and submarine bells for tourist use.

SUMMARY OF THE INVENTION

The process according to the present invention overcomes at least the aforementioned disadvantages or shortcomings in the prior art. In fact, it consists, according to a first characteristic, in manufacturing on a series basis and then assembling a finite number of two or more types of triangular structures with rectangular, isosceles or equilateral form having the following characteristics:

Monobloc triangular structure made of a section covered in a plastic material. The plastic material may, moreover, be a heat-hardening resin or a thermoplastic polymer, a paste which has plastic properties during the manufacturing process, such as a plaster—or cement—based paste. As for this case, a person of ordinary skill in the art can adapt the mould and select the mostly adequate moulding process depending on the material being used;

Having a top or outer thickness, i.e., length, greater than a bottom or inner surface thickness (length) to form an angled outer surface, and an inner shouldering allowing for inclusion of a double wall, where a side panel is positioned on each side of the inner shoulder;

Having a groove for inserting seal members to provide a watertight seal with adjacent structures;

Having certain angular faces allowing assembling in dihedron of groups of triangles; and/or Showing at their tops (i.e., apexes) such indentations which complement, through a cylindrical piece embedded during the assembling process, both the fixation of final structures to the ground and the water-tight tackling of the covering surfaces of the triangular structures.

Figure 1:
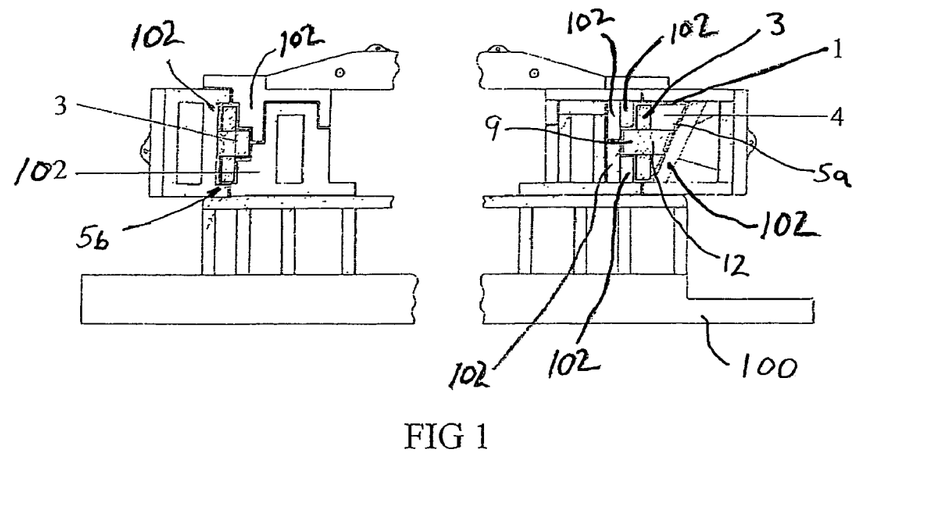
FIG. 1 depicts a cross-sectional view of a mould with a triangular structure of the present invention being formed therein.

According to an embodiment and referring to FIG. 1, the triangular shape structural elements can be formed from steel sections, such as rectangular tubes that are cut and welded according to a specific template. The rectangular tube sections are positioned at predetermined distances between the inner walls of a female mould. The walls may already be pre-covered with polyester resin layered with fiberglass. After closing the three parts of the mould, polyurethane foam is injected. The use of the mould ensures the series manufacturing of triangular structures perfectly identical, including the angles necessary to assembling.

During the coating process for the inner walls of the mould using polyester resin layered with fiberglass, parallel grooves may be formed on the three outer faces (i.e., outer surfaces) into the triangle thickness. These grooves can receive a seal member that is used to form at least a watertight seal with an adjacent triangular structure. A watertight environment is ensured by the fact that during the assembling process, each triangular structure provides and receives a watertight seal with of the adjacent triangular structure. Each outer face of a triangular structure is then served by at least two watertight seals despite the even or odd (i.e., alternating) position within the assembling sequence of the different shaped triangular elements. The outer and inner sides from both sides of the sealing members between two adjacent triangular structures can accordingly be fully insulated.

During the coating process of the inner walls of the mould using the polyester resin layered with fiberglass, an indentation at the level of each top of a triangular structure can be formed. Such indentations are shaped in a circular arch, such that when multiple monobloc structures are positioned adjacently side-by-side, a complete cylindrical channel is formed by the joined apexes of the multiple monobloc structures. The housings of seal members are successive within the indentations. In each of such indentations, a groove may be provided in the middle point of other indentations in order to receive a seal member to perfect the watertight ability of the cylindrical piece embedded in the channel mentioned above during the assembling process. This cylindrical piece can serve as a particular knot (i.e., connector) device to secure the whole final structure in a form of dome or chapel-shape to the ground (i.e., Earth), using cables and/or steel tubes as anchors. Such cylindrical connector can also serve as support for levers provided to chuck the covered surfaces of the triangular structures, as described below in further detail with respect to FIG. 7.

Each monobloc triangular structure can include, by reason of the form of the section, a shouldering formed over the inner faces of its thickness. The sides of the shouldering can include one or more grooves, which can be formed during the coating process for the inner walls of the mould by the polyester resin layered with fiberglass. The grooves can house a seal member to provide a watertight seal with a cover or side panel. Optionally, the sides of the shouldering and the watertight seals can be fitted with covering surfaces (e.g., side panels) to form a double wall, which are chucked to the sides of the shouldering. Such covering surfaces can be fabricated from glass material, polycarbonates, Plexiglas or any other material, even non hard material, such as a plastic film. The covering surfaces can be chucked against the watertight seals using hard metallic frames, which are secured to levers using adjustable tightening screws.

In an embodiment, there can be provided along the thickness of each side of the triangular structure during the shaping process of the section, three hollowing-outs (i.e., channels), as follows:

A central channel ensures communication of the confined space present in the double wall of two adjacent triangular structures. A heat-conducting fluid, such as water may then circulate from one triangular structure to another and then through the whole final structure in a direction which can be induced by means of a pump. To that fluid, a pigment can be added to color it and/or make it more or less opaque. Thus, an excess of heat may be diminished or, to the contrary, heat transmitted by the envelope, and then made watertight, may be brought along, to the hermetically closed space formed by the inner volume on the dome-shaped or chapel-shaped final structure. Also, by air aspiration, a relative vacuum within the thickness may be created, thereby increasing the insulation of the structure's inner space from the outer environment.

The other two channels located from both sides of the central channel can serve to introduce threaded, slightly curved and/or straight rods depending on the dihedron being present. Such rods can secure, using such nuts and wedges which perfectly embed into the channels the sides of two adjacent structures.

BRIEF DESCRIPTION OF THE DRAWINGS

Further advantages and features of the present invention will become apparent from the detailed description of a preferred embodiment of the invention with reference to the accompanying drawings, in which.

To facilitate understanding of the invention, identical reference numerals have been used, when appropriate, to designate the same or similar elements that are common to the figures. Further, unless stated otherwise, the drawings shown and discussed in the figures are not drawn to scale, but are shown for illustrative purposes only.

DETAILED DESCRIPTION OF THE INVENTION

Figure 2:
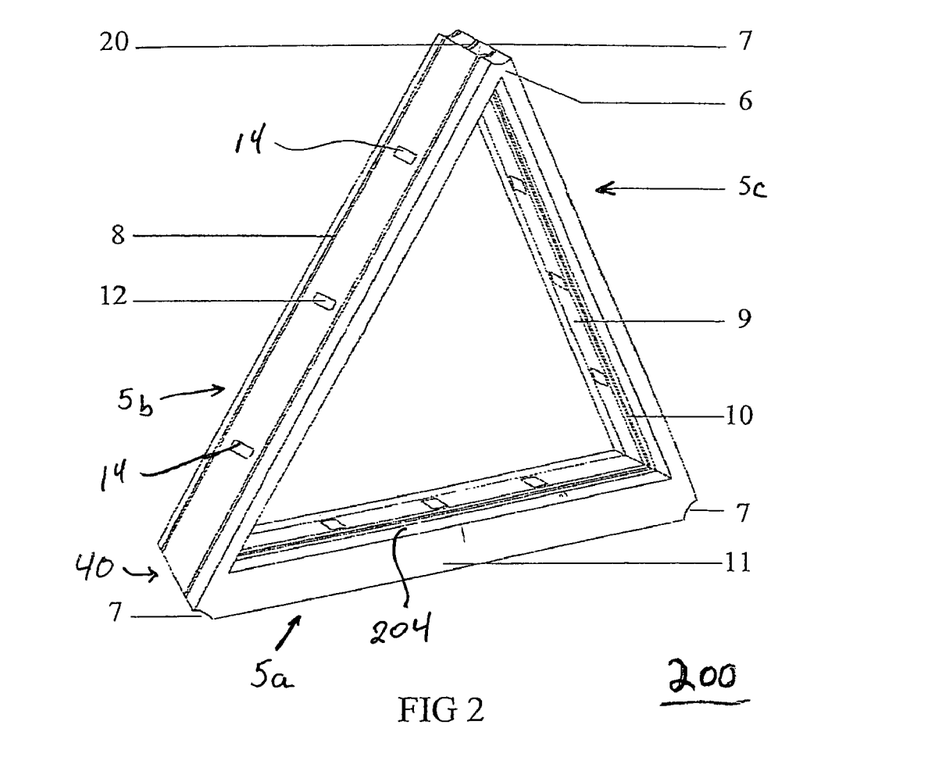
FIG. 2 depicts a right, outer surface perspective view of the triangular structure of the present invention manufactured using the mould of FIG. 1.

By reference to those drawings, and particularly FIGS. 1 and 2, each triangular structural element (200) is preferably fabricated using a mould (100). In one embodiment, the process includes coating, with polyester resin layered with fiberglass or with other coating plastic material (1), the inner faces (102) of a mould (100) so as to include all its inner matrix. An elongated section (3), which was previously cut and welded in a template according to the type of triangle (e.g., equilateral, isosceles, right angle) and the height levels chosen, is placed at the bottom of the mould (100). Such section (3) is maintained at a definite distance from the mould walls (102) using the edges provided in the mould walls and penetrating the section. After closing the parts of the mould, an annular cavity (208) is formed between the section (3) and the inner surface of the coating material (1). A polyurethane foam (4) is injected into the cavity (208) to form the three leg members (5a), (5b) and (5c) (collectively leg members (5)) of the triangular structure (200).

Figure 3:
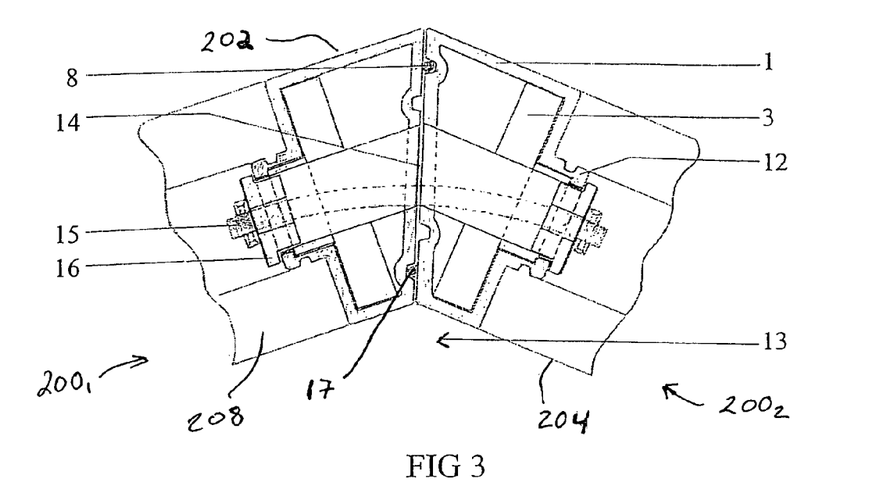
FIG. 3 depicts a cross-section view of the assembly in a dihedron of two adjacent triangular structures which include angled edges that interface to form a dihedron angle.

Referring to FIGS. 2 and 3, the triangular structure (200) obtained after hardening of the polyester resin (1) and the polyurethane foam (4) is:

A monobloc structure (200), having an outer surface (202), inner surface (204) and opposing side surfaces (206). The interior part of leg members (5) is empty due to the use of the section (3), thereby forming an annular cavity (208).

The polyurethane foam (4) fills the annular cavity (208) to provide insulation.

A structure, the tops (i.e., apexes) (6) of which include no external joints, due to the plastic coating (1).

A triangular structure (200), the tops of which include indentations (7) in form of a well-defined circular arch.

On the face (i.e., outer surface) of each leg member (5) of a given structure includes grooves (8).

Figure 4:
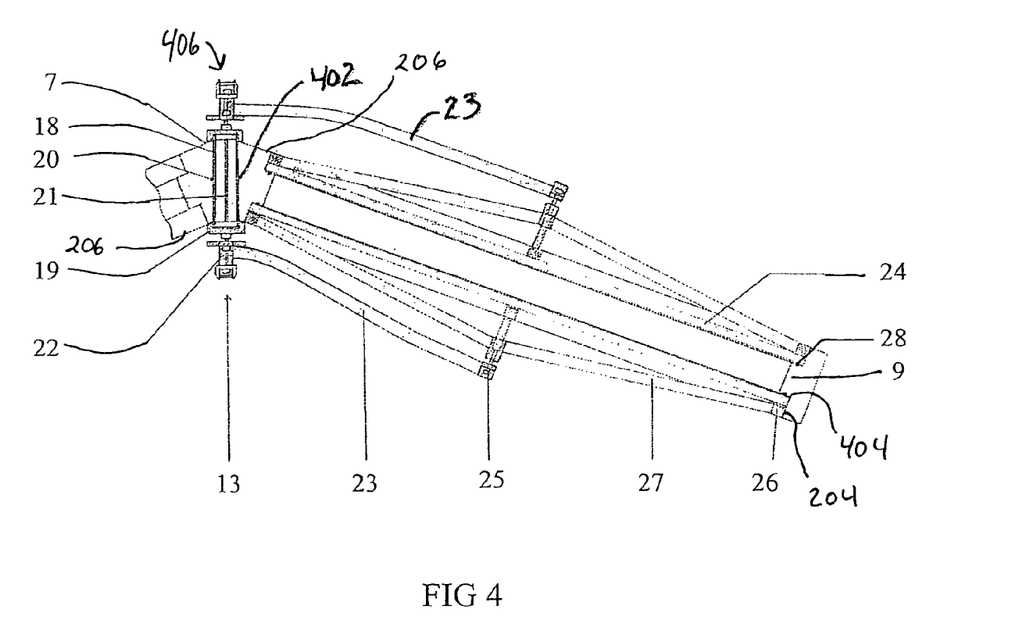
FIG. 4 depicts a cross-section view in dihedron of two triangular structures connected together at their apexes with a cylindrical connector, and opposing side panels positioned over the outer and inner areas of the triangular structure which are secured by radially extending levers and rigid chucking frames.

The raised shouldering (9) formed on inner faces (204) of each leg member (5) of a triangular structure (200) includes a groove (10) on both its side edges (404), the groove (10) sized to receive a watertight seal member (28) (see FIG. 4).

A structure including at least one leg member (5) having opposing sides with different thickness (11), e.g., heights, to form an angled (sloping) outer surface (40) extending between the opposing sides.

A structure which shows on each of its faces at least three ports (12) corresponding to channels (14) designed into the section (3).

In the embodiment according to FIG. 3, two triangular structures (200₁) and (200₂) are assembled according to a definite (i.e., predetermined) angle and make a dihedron (13) which contributes during the assembling process of the whole triangular structures to the construction of a dome having the form of truncated icosahedrons or of a chapel-shaped greenhouse. The dihedron angle (13) is formed by aligning the angled outer surface (40) of adjacent triangular elements together. Both channels (e.g., upper and lower channels) (14) then formed, in the two structures, by a rectangular tube section are positioned face-to-face so as to form a port (12) in the thickness of the polyester resin layered with glass fiber (1). A threaded and slightly curved rod (15) is introduced during the assembling process through the two channels (14) and secures the structures (200₁) and (200₂) by means of nuts and wedges (16), which tightly embed within the section (3). The seal members (17) are placed into grooves (8) during the assembling process so as between the sides of two adjacent triangular structures (200₁) and (200₂); there exist already two parallel seal members both which close around one of the two triangular structures.

Figure 7:
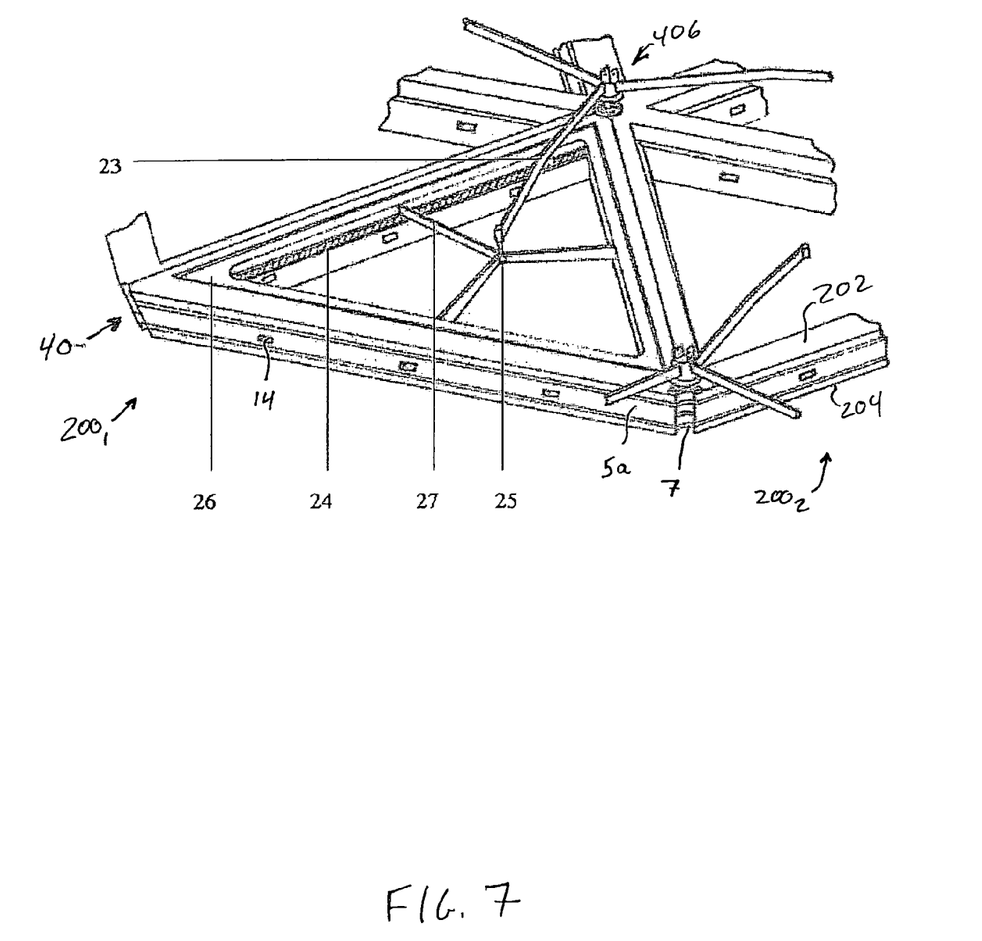
FIG. 7 depicts a top perspective view of adjacent triangles of the present invention having side panels secured thereover.

In the embodiment according to FIG. 4, the knot or connector device (406) at the top (i.e., apex) of a set of triangular structures assembled, is a cylinder (18) which is embedded in the hollow (i.e., aperture) formed by the indentations (7) joined together. Such cylinder (18) closes hermetically at the two edges by two lids (19) which hug the dihedral angle (13). Such cylinder (18) includes in its middle point a seal member (402), which is placed during the assembling process between two parallel seal members (8) carried by the triangular structures, into a groove (20) which is provided to it within the indentations (7) of each triangular structure. The two cylinder lids (19) are crossed by a threaded rod (21) which contains in its outer part:

A device (22) on which securing-to-ground cables and/or tubes are fixed;

Referring to FIG. 7, two opposing levers (23), each of which makes a bissectrix on one of the two covered surfaces. Each lever (23), through an adjustable tightening screw (25) and three arms (27), secures a rigid frame (26) extending along the perimeter over the seal members (28) inserted in the grooves (10) formed in the opposing sidewalls (404) of the raised shoulder (9). Each arm (27) has a distal end extending to the frame (26) and positioned between two apexes of the triangular structure, and the opposing proximate ends of the arms (27) joined together and attached to the tightening screw (25) above the barycentre of the triangle formed by the covering surface (24). One end of the lever (23) is attached to the tightening screw (25) and the opposing end of the lever (23) is attached to the connector device (406). The rigid frames (26) thereby chuck the covering surfaces (24) against the seal members (28) provided in each side (404) of the inner shouldering (9) of the triangular structure (200).

Figure 5:
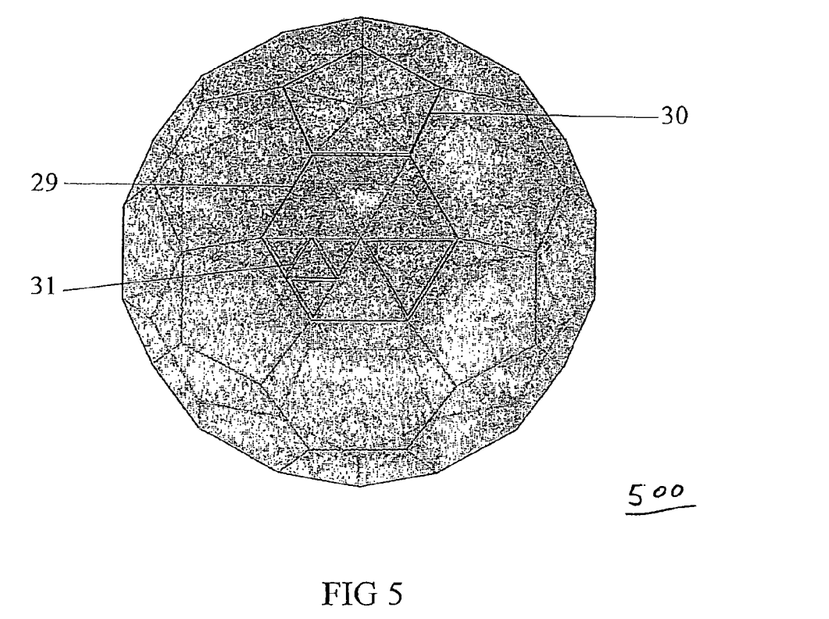
FIG. 5 depicts an assembling method of configuring equilateral and isosceles shaped triangular structures of the present invention to form a truncated cone icosahedrons in a manner suitable to double its volume.

In the illustrative embodiment shown in FIG. 5, the assembly of six equilateral triangular structures can be used to form a hexagon (29) and five isosceles triangular structures can be used to form a pentagon (30), which collectively contributes to manufacturing a final structure of a dome (500) that is constructed in the form of truncated icosahedrons. However, the assembly of four equilateral triangular structures (31) to form a triangular structure with double dimension allows to form a hexagon of double size; this can be achieved by handling the order and the angle modifying the thickness of one of the sides of the elementary triangular structures during the moulding process. By this process, also applied to pentagon, we can achieve a doubling of the overall volume of the constructed dome.

Figure 6:
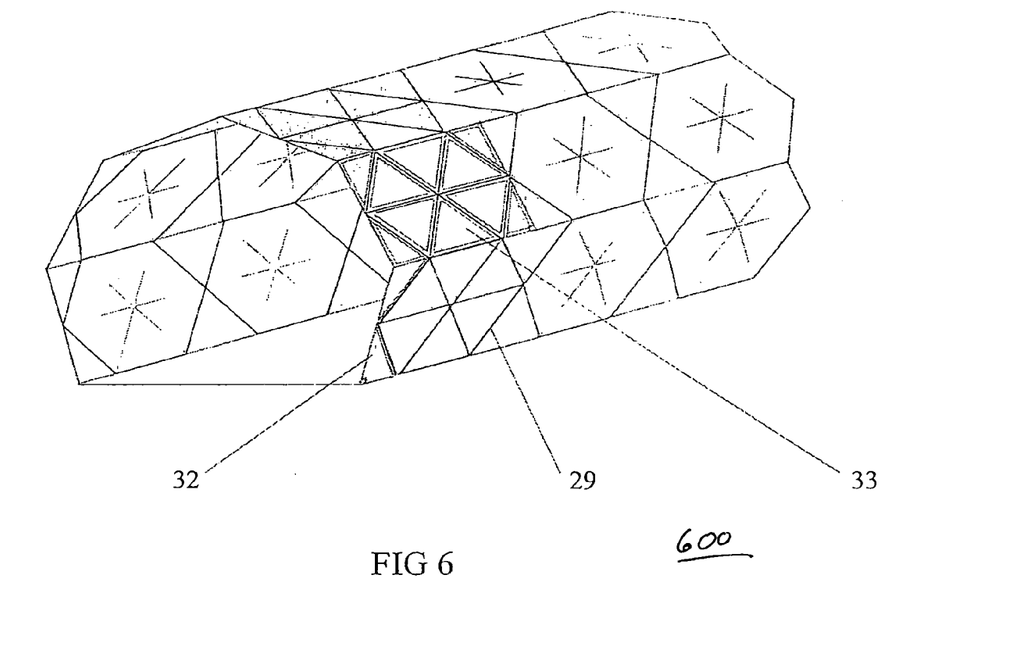
FIG. 6 depicts an assembling method of configuring equilateral and right angle triangles in groups to form larger hexagon and rectangular shaped elements, which collectively form a greenhouse in a manner suitable to double its volume.

In the illustrative embodiment shown in FIG. 6, the assembly of six equilateral triangular structures can be used to form a hexagon (29). A plurality of right triangular structures (32) can be added in order to transform the hexagon (29) into a square shaped structure (33), which can further be used to form a portion of a final structure such as a chapel-shaped greenhouse (600). However, the assembly of two squares (33) into one rectangle can also be achieved by handling the order and the angle modifying the thickness of one side of the elementary triangular structures during the moulding process, which can double the height of the final structure and thereby allow constructing a chapel-shaped greenhouse twice as large in size.

Further embodiments of the triangular elements can include:

Equilateral, isosceles and right triangular structures elaborated during the moulding process without an over thickness (11) i.e., without a beveled an angled edge along of one of their sides (e.g., leg 5a of FIG. 2) and accordingly without any dihedral angle (13) may, when assembled, form perfectly plane structures with double wall. These triangular structures without an angled edge can serve, subsequently, as walls, slabs and other additive elements in construction of geodesic domes and chapel-shaped greenhouses.

Triangular structures showing a curvature in space dimensions may be moulded when each of the three sides of a structure is itself moulded in a curved shape in the direction of the structure's overall curvature. Such structures contribute, when assembled, to obtaining an entirely spherical form.

As non-limitative example, the process uses series monobloc pre-fabricated triangular structures which will have the shape of equilateral, isosceles and right triangle. In the case of a triangular structure having the shape of an equilateral triangle, the dimensions illustratively can be about 0.80 meter in length per leg, 0.10 to 0.06 meters in thickness and make a double wall of 0.4 meters in depth.

The process according to the present invention is particularly suitable for manufacturing domes in series (proceeding from truncated icosahedrons), chapel-shaped greenhouses, and submarine bells.

While the foregoing is directed to embodiments of the present invention, other and further embodiments of the invention may be devised without departing from the basic scope thereof, and the scope thereof is determined by the claims that follow.

The invention claimed is:

1. An apparatus for forming a geodesic structure, the apparatus including at least one triangular element comprising:
three elongated leg members each having opposing ends arranged end-to-end to form three apexes defining a monobloc triangular structure; each elongated leg member forming a side portion of the triangular structure, said triangular structure having an inner surface, an outer surface and opposing side surfaces positioned between the inner and outer surfaces; at least one of the apexes being formed with an arcuate indentation that extends traverse to the outer surface and perpendicular to the opposing side surfaces;
each leg member of the triangular element further comprising:
at least one outer groove extending longitudinally along the outer surface, each outer groove being sized and configured to receive an outer seal member;
an inwardly projecting raised shoulder having opposing side walls and extending longitudinally along the inner surface;
at least one inner groove extending longitudinally in at least one of the opposing side walls of said raised shoulder, each inner groove being sized and configured to receive an inner seal member; and
at least one channel extending from the outer surface and through the raised shoulder of the inner surface.

2. The apparatus of claim 1, wherein at least one of said leg members has a thickness on a first side surface that is greater than a thickness on the opposing side surface to define an angled outer surface that extends between the opposing side surfaces.

3. The apparatus of claim 2, wherein the thicknesses of the first side surface of the at least one leg member is a length measured from its respective inner surface to its outer surface, and the thicknesses on the opposing side surface of the at least one leg member is a length measured from its respective inner surface to the outer surface thereof.

4. The apparatus of claim 1, wherein the at least one outer groove extending longitudinally along the outer surface comprises a pair of outer grooves.

5. The apparatus of claim 1, wherein the at least one inner groove comprises a first inner groove formed along a first side of the raised shoulder and a second inner groove formed along an opposing side of the raised shoulder.

6. The apparatus of claim 1, wherein each leg member further comprises an elongated sectional member extending longitudinally within the interior of the leg member, said outer surface, inner surface and opposing sidewalls being radially spaced a predetermined distance from the sectional member to form an elongated cavity therebetween.

7. The apparatus of claim 6, wherein the sectional member of each leg is an elongated metal tubular structure.

8. The apparatus of claim 6, wherein the outer, inner and opposing side surfaces of each leg are molded over the sectional member and are formed from a polyester resin layered with fiberglass.

9. The apparatus of claim 6, further comprising a polyurethane foam layer formed in the cavity.

10. The apparatus of claim 1, wherein the plurality of channels extending through the outer surface and raised shoulder includes three channels.

11. The apparatus of claim 1, further comprising at least one side panel disposed along the side walls of said raised shoulder.

12. The apparatus of claim 11, further comprising a seal member respectively positioned in the longitudinal inner groove of the side wall of said raised shoulder and in contact with the side panel to provide a watertight seal therebetween.

13. The apparatus of claim 1, wherein said arcuate indentation includes at least one transverse indentation groove that is sized and configured to receive at least a portion of an outer seal member.

14. The apparatus of claim 1, wherein the at least one triangular element comprises a plurality of triangular elements, each of said triangular elements having at least one outer surface of an elongated leg member positioned adjacent a corresponding member of another triangular element, said plurality of triangular elements being arranged in a predetermined array to form at least a portion of the geodesic structure.

15. The apparatus of claim 14, wherein the plurality of triangular elements are arranged to form a dihedral angle within said geodesic structure.

16. The apparatus of claim 14, wherein said a plurality of arcuate indentations formed at the respective apexes of the plurality of adjacent triangular elements join to define a circular orifice.

17. The apparatus of claim 16, further including a connector extending through said orifice formed by adjacent apexes of the plurality of adjacent triangular elements, said connector having end clamps for sealing said orifice.

18. The apparatus of claim 17, wherein the connector further comprises a plurality of levers, each lever extending radially outward from a central axis for exerting a normalized retaining force on a panel covering a side of the triangular element.

19. The apparatus of claim 18, further including a frame that is disposed over each side panel, wherein said radially-extending levers exert the normalized force on the frame to retain the panel in position to cover the side of the triangular element.

20. The apparatus of claim 14, wherein the at least one outer groove formed in the outer surface of each triangular element includes a seal member to provide a watertight seal between said adjacent triangular elements.

21. The apparatus of claim 14, wherein the at least one channel of each triangular element is aligned with a corresponding channel of an adjacent triangular element to define a single channel extending from the inner raised shoulder of one triangular element to the inner raised shoulder of the adjacent triangular element.

22. The apparatus of claim 21, wherein a connecting rod extends through said single channel to retain said adjacent triangular elements together.

23. The apparatus of claim 21, wherein a fluid flows through said adjacent channels of each adjacent triangular element.

24. The apparatus of claim 23, wherein opposing side panels are securely disposed over opposing sides of each triangular element to form a fluid-tight seal, and the fluid flows through said adjacent channels and between said opposing side panels.

25. The apparatus of claim 23, wherein opposing side panels are securely disposed over opposing sides of each triangular element to form a fluid-tight seal, and a vacuum is formed through said adjacent channels and between said opposing side panels.

26. The apparatus of claim 23, wherein the plurality of triangular elements are grouped to form larger polygonal structures having at least four sides, which polygonal structures are further positioned adjacent each other to form the geodesic structure.

27. The apparatus of claim 6, wherein the outer, inner and opposing side surfaces of each leg are molded over the sectional member and are formed from a cement or plaster material.

* * * * *